United States Patent
Turturiello et al.

(10) Patent No.: US 7,314,220 B2
(45) Date of Patent: Jan. 1, 2008

(54) SUSPENSION SYSTEM FOR A POWERED WHEELCHAIR

(75) Inventors: George A. Turturiello, Honesdale, PA (US); Michael J. Rozaieski, Drums, PA (US)

(73) Assignee: Pride Mobility Products Corporation PA (US)

( * ) Notice: Subject to any disclaimer, the term of this patent is extended or adjusted under 35 U.S.C. 154(b) by 379 days.

(21) Appl. No.: 10/881,126

(22) Filed: Jun. 30, 2004

(65) Prior Publication Data

US 2004/0262859 A1  Dec. 30, 2004

Related U.S. Application Data

(60) Provisional application No. 60/509,488, filed on Oct. 8, 2003, provisional application No. 60/484,261, filed on Jun. 30, 2003.

(51) Int. Cl.
*B60G 17/016* (2006.01)

(52) U.S. Cl. ............ 280/5.5; 280/755; 280/304.1; 280/5.513; 180/907

(58) Field of Classification Search ........... 280/250.1, 280/755, 304.1, 5.513, 5.515; 188/167, 381; 267/196; 180/282, 907
See application file for complete search history.

(56) References Cited

U.S. PATENT DOCUMENTS

| | | | | |
|---|---|---|---|---|
| 3,883,153 A | | 5/1975 | Singh et al. ............ 280/124 R |
| 3,905,437 A | * | 9/1975 | Kaiho et al. ................ 180/15 |
| 4,437,678 A | * | 3/1984 | Schultz ..................... 280/276 |
| 5,097,419 A | | 3/1992 | Lizell .................. 364/424.05 |
| 5,851,019 A | | 12/1998 | Gill et al. ................... 280/286 |
| 5,964,473 A | | 10/1999 | Degonda et al. ......... 280/250.1 |
| D429,665 S | * | 8/2000 | Dickie ...................... D12/133 |
| 6,129,165 A | * | 10/2000 | Schaffner et al. .......... 180/65.1 |
| 6,341,657 B1 | * | 1/2002 | Hopely et al. .............. 180/6.5 |
| 6,554,086 B1 | * | 4/2003 | Goertzen et al. .......... 180/65.1 |
| 6,588,799 B1 | | 7/2003 | Sanchez .................... 280/755 |
| 6,923,278 B2 | | 8/2005 | Mulhern et al. .......... 180/65.1 |
| 7,083,195 B2 | | 8/2006 | Goertzen et al. .......... 280/755 |
| 2002/0161498 A1 | | 10/2002 | Stiller et al. ................. 701/37 |
| 2004/0094944 A1 | | 5/2004 | Goertzen et al. |
| 2005/0077714 A1 | * | 4/2005 | Mulhern et al. ............ 280/755 |
| 2005/0077715 A1 | * | 4/2005 | Mulhern et al. ............ 280/755 |

(Continued)

FOREIGN PATENT DOCUMENTS

WO    WO 00/12040    3/2000

(Continued)

*Primary Examiner*—Eric Culbreth
*Assistant Examiner*—Barry Gooden, Jr.
(74) *Attorney, Agent, or Firm*—DLA Piper US LLP (57) ABSTRACT

A variable stiffness suspension system is provided for a wheelchair. The wheelchair has a frame and at least one wheel coupled to the frame for generally vertical movement relative to the frame. At least one sensor is provided for sensing an operating condition of the wheelchair. A controller is operatively coupled to the sensor. A controllable damper having a variable stiffness is coupled to the controller, the wheel and to the frame. The controllable damper is responsive to the controller and provides a force capable of being varied in a continuous manner. The force is resistive to movement of the wheel. The controllable damper is preferably a commercially available magneto-rheological damper or a variable orifice fluid damper. The controllable damper may be either a linear damper or a rotary brake.

24 Claims, 4 Drawing Sheets

U.S. PATENT DOCUMENTS

| | | |
|---|---|---|
| 2005/0151360 A1 | 7/2005 | Bertrand et al. |
| 2005/0206149 A1* | 9/2005 | Mulhern et al. ............ 280/755 |
| 2006/0022445 A1* | 2/2006 | Mulhern et al. ............ 280/755 |
| 2006/0076748 A1* | 4/2006 | Pauls et al. ............ 280/124.11 |

FOREIGN PATENT DOCUMENTS

| | | |
|---|---|---|
| WO | WO 03/101364 A2 | 11/2003 |
| WO | WO 2004/016451 A2 | 2/2004 |
| WO | WO 2004/037569 A2 | 5/2004 |

* cited by examiner

SUSPENSION SYSTEM FOR A POWERED WHEELCHAIR

CROSS-REFERENCE TO RELATED APPLICATIONS

This application claims benefit of U.S. Provisional Patent Application 60/484,261, "Transportable Wheelchair", filed Jun. 30, 2003, the subject matter of which is incorporated herein by reference, and U.S. Provisional Patent Application 60/509,488 "Active Suspension System for Wheelchair Anti-tip System", filed Oct. 8, 2003, the subject matter of which is also incorporated herein by reference.

BACKGROUND OF THE INVENTION

The present invention relates to suspension systems employed with powered wheelchairs, and more particularly, to suspension systems which adapt to various operating conditions of the wheelchair.

Powered wheelchairs having drive systems incorporating anti-tip wheels coupled to the wheelchair frame for movement up and down relative to a surface supporting the wheelchair are known in the art. For example, U.S. Pat. No. 6,129,165 to Schaffner et al., assigned to Pride Mobility Products Corporation of Exeter, Pennsylvania, discloses a wheelchair having a drive system including a drive assembly which is coupled to anti-tip wheels pivotally mounted to the wheelchair frame. The anti-tip wheels pivot up and down relative to the supporting surface in response to moments created by the drive motors during acceleration or deceleration of the wheelchair. It would be desirable that a wheelchair having pivotally mounted anti-tip wheels provide variable resistance to movement of the wheels depending upon the operating condition of the wheelchair. For example, if the wheelchair is operating on a downward incline, it would be desirable that resistance to movement of the anti-tip wheels be increased to retard upward movement of the anti-tip wheels and thus promote stability of the wheelchair. Similarly, when the wheelchair is climbing a curb or other obstacle, it would be desirable that the resistance to upward movement of the anti-tip wheels be minimized to facilitate movement of the anti-tip wheels over the obstacle. A need exists for a wheelchair wheel suspension system having variable stiffness characteristics.

SUMMARY OF THE INVENTION

The invention is a variable stiffness suspension system for use with a wheelchair. The wheelchair has a forward end and an rear end, a frame, and at least one wheel coupled to the frame for movement relative to the frame. The wheelchair has a drive assembly operably coupled to the wheel to move the wheel toward or away from a supporting surface upon which the wheelchair is supported in response to moments generated by the drive assembly. The suspension system comprises at least one sensor for sensing an operating condition of the wheelchair and generating a control input signal indicative of the operating condition. A controller is operatively coupled to the sensor and is responsive to the control input signal for generating a control output signal. A controllable damper having a variable stiffness is operably coupled to the controller, the wheel and to the frame. The controllable damper provides a variable resistive force capable of being varied to any of multiple levels of force within a continuous range between upper and lower limits in response to the control output signal. The force is resistive to the movement of the wheel.

The controllable damper is preferably a commercially available magneto-rheological damper or a fluid damper having an orifice with a size capable of being varied in response to the control output signal. The controllable damper may be either a linear damper or a rotary brake.

The basic aspects of the present invention may be combined in a number of forms. The preferred aspects of the various constructions may be used in conjunction with one another or used alone. The various features provide certain advantages over the prior art. These advantages will be described herein and will be understood by those skilled in the art upon reviewing the description and drawings.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

DETAILED DESCRIPTION OF THE INVENTION

Figure 1:
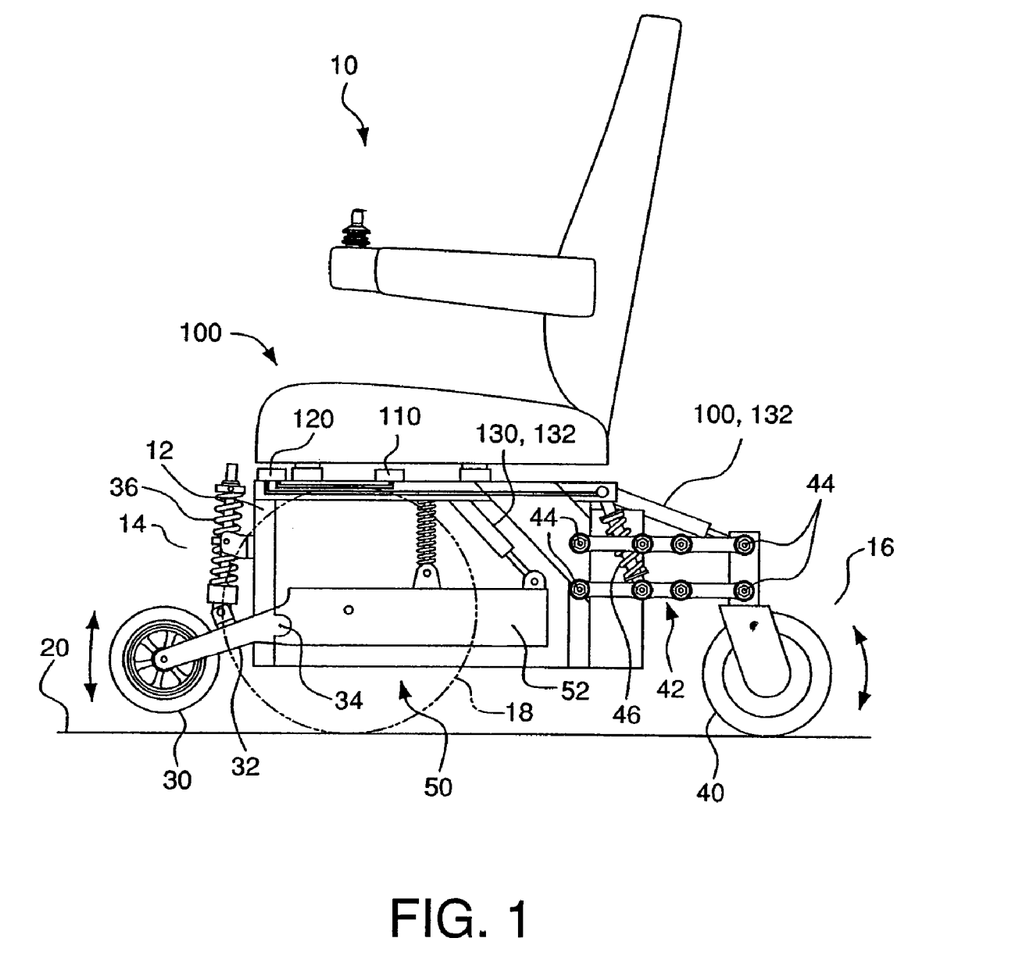
FIG. 1 is a schematic partial side view of a powered wheelchair having one of its drive wheels removed and portions of the chassis/body broken-away to show elements of a prior art drive system coupled with a variable stiffness suspension system in accordance with a first embodiment of the present invention.

Referring to the drawings, and initially to FIG. 1, a mid-wheel-drive curb climbing power wheelchair is indicated generally by the reference numeral 10. The wheelchair 10 comprises a frame 12 and has first and second lateral sides, a front end 14 and a rear end 16. The wheelchair 10 is supported on a supporting surface 20 by a pair of drive wheels 18 in combination with or more front wheels 30 and/or rear wheels 40.

The wheelchair 10 is preferably provided with a seat for a user, motors, batteries to provide power to the motors, a joystick to control the motors, and the like. These features are known from, for example, above-mentioned U.S. Pat. No. 6,129,165, which is herein incorporated by reference in its entirety. In the interest of conciseness, these features are not further described here.

Preferably, a pair of front wheels 30 are provided proximate the front end 14. The front wheels 30 are coupled to the wheelchair frame 12 by a front wheel support assembly 32, and are mounted at a forward pivot connection 34 for pivotal movement relative to the wheelchair frame 12. A front wheel biasing assembly 36 is preferably provided, acting to bias the front wheels 30 into a predetermined position. The front wheel biasing assembly 36 is preferably a conventional bi-directional spring strut pivotally connected to the frame 12 at a first point and pivotally connected to the front wheel support assembly 32 at a second point. The front wheels 30 may be biased into contact with the supporting surface 40 in the predetermined position. Alternatively in the predetermined position the front wheels 30 may be positioned above the supporting surface 40.

Figure 2:
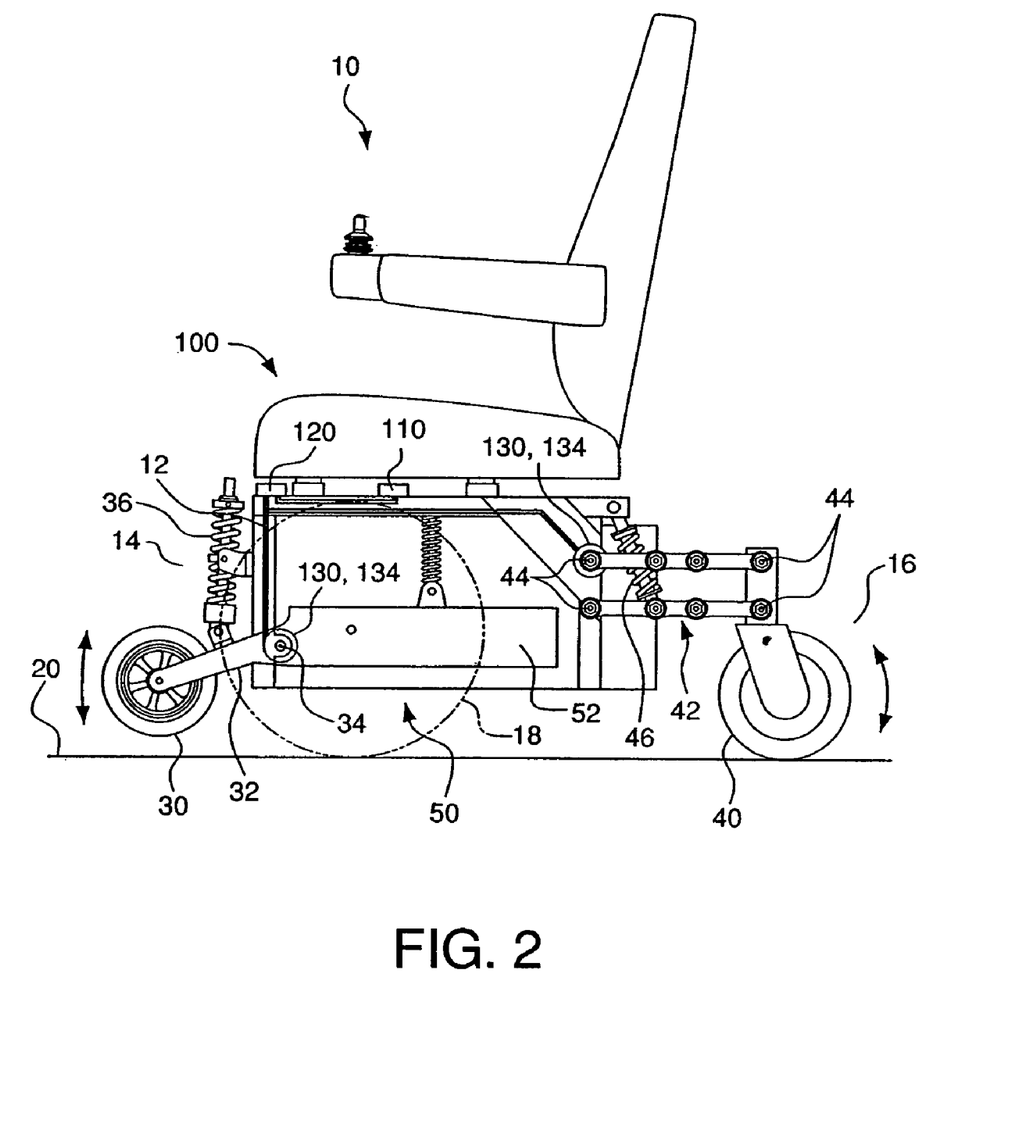
FIG. 2 is a schematic partial side view of a powered wheelchair having one of its drive wheels removed and portions of the chassis/body broken-away to show elements of the prior art drive system of FIG. 1 coupled with a variable stiffness suspension system in accordance with a second embodiment of the present invention.

The front wheels 30 are movable generally vertically relative to the frame 12, for example, by the mechanisms disclosed in above-mentioned U.S. Pat. No. 6,129,165. A drive assembly 50, comprising a drive motor 52, such as that used in the invention of the '165 patent may be incorporated into first and second embodiments of the present invention, as illustrated in FIGS. 1 and 2, respectively. The drive assembly 50 is mounted for pivotal movement relative to the frame 12, and operably coupled to the front wheel support assembly 32 and the front wheels 30 such that moments developed by the drive assembly 50 cause the front wheel support assembly 32 to pivot about forward pivot connection 34, causing the front wheels 30 to move generally vertically relative to the frame 12.

Preferably, a pair of rear wheels 40 are provided proximate the rear end 16. The rear wheels 40 are coupled to the wheelchair frame 12 by a rear wheel support assembly 42. The rear wheels 40 are preferably coupled at one or more rear pivot connections 44 for pivotal, generally vertical movement relative to the frame 12. In the preferred embodiments illustrated in FIGS. 1-3, the rear wheel support assembly 42 comprises multiple links, having multiple pivot connections 44 to the frame 12. A rear wheel biasing assembly 46 is preferably provided, acting to bias the rear wheels 40 into a predetermined position. The rear wheel biasing assembly 46 is preferably a conventional bi-directional spring strut pivotally connected to the frame 12 at a first point and pivotally connected the rear wheel support assembly 42 at a second point. The rear wheels 40 are preferably biased into contact with the supporting surface 20. In the embodiment illustrated, the rear wheels are not operatively coupled with the drive assembly 50 for generally vertical movement in response to movement of the drive assembly 50.

With continued reference to FIG. 1, a first embodiment of a variable stiffness suspension system 100 for use with the wheelchair 10 comprises at least one sensor 110 for sensing an operating condition of the wheelchair 10 and for generating a control input signal indicative of the operating condition. Alternatively, multiple sensors 110 may be provided for sensing multiple operating conditions of the wheelchair and generating multiple control input signals each indicative of one of the multiple operating conditions.

The operating condition indicated by the sensor 110 may include, for example, forward, aft or lateral tilt of the wheelchair 10. Alternatively, the operating condition may be the position of another component of the wheelchair 10, for example, the position of the drive assembly 50 or the position of the front wheel support assembly 32. The sensor 110 could be adapted to receive input from a user, for example via user controls. Further alternatively, the operating condition could be the existence of inertial forces (acceleration or deceleration) acting on the wheelchair 10. Still further, the operating condition could include speed or direction of motion or changes thereof.

Depending upon the operating condition or conditions to be monitored, various types of sensors 110 may be employed. For example, to monitor forward, aft, or lateral tilt of the wheelchair 10, a tilt sensor, such as a mercury switch or a gyroscopic sensor, could be used. The existence of inertial forces could be inferred from measurements of torque generated by the motor made by a torque sensor. The position of a movable component of the wheelchair 10 (for example, position of the front wheel 30) could be monitored by a microswitch or a linear variable displacement transducer. Optical sensors could be employed to measure speed. Alternatively, the sensor 110 could be a switch manually actuated by the a user of the wheelchair 10 to activate the controllable damper 130.

The control input signal indicative of the operating condition is transmitted to a controller 120. The controller 120 is operatively coupled to the sensor 110, and is responsive to the control input signal to generate a control output signal to a controllable damper 130. The controller 120 may be any signal processing unit capable of receiving the control input signal, determining the desired control output signal to the controllable damper 130 via a look-up table or other conventional control logic, and generating the control output signal corresponding to a desired response. A power supply 140 provides power to the sensor 110, controller 120 and controllable damper 130.

The controllable damper 130 has variable stiffness. The controllable damper 130 is operably coupled to the controller 120, the front wheel 30 or rear wheel 40, and to the frame 12. The controllable damper 130 provides a variable resistive force capable of being varied in a continuous manner within a range between upper and lower force limits in response to the control output signal and resistive to movement of the front wheels 30 or rear wheels 40. For example, when the wheelchair 10 is descending a sloped supporting surface 20, and the wheelchair 10 is subject to pitching forward, it will generally be desirable to increase the resistive force to restrain upward movement of the front wheels 30, and to provide stabilization of the wheelchair 10. Alternatively, when the wheelchair 10 is climbing an obstacle, it will generally be desirable to decrease the resistive force to promote upward movement of the front wheels 30, and to facilitate movement of the wheelchair 10 over the obstacle. At the upper force limit, the controllable damper 130 is effectively locked in position. The lower force limit preferably corresponds to a negligibly low force (for example, less than 10 pounds) being required to move the piston at a rate of at least 1 inch per second.

Various types of controllable damper 130 may be used. For example, the controllable damper 130 may be a magneto-rheological fluid damper available from Lord Corporation, Cary N.C. in either a linear piston damper 132 embodiment or a rotary brake 134 embodiment. Magneto-rheological fluid dampers operate based on the principle that certain fluids infused with magnetically sensitive particles exhibit radically different viscosities when exposed to magnetic fields of varying strength. Alternatively, the controllable damper 130 could be a linear piston damper 132 or rotary brake 134 having separate chambers filled with a viscous fluid and separated by a movable element and an orifice with a size capable of being varied in response to the control output signal. The orifice is in fluid communication with each of the chambers. Movement of the movable element is hindered or facilitated by decreasing or increasing, respectively, the size of the orifice. Such variable orifice fluid dampers are known in the prior art, being described, for example, in G. Yang "Large-Scale Magnetorheological Fluid Damper for Vibration Mitigation: Modeling, Testing and Control," Ph.D dissertation, University of Notre Dame, 2001. In general, any linear or rotary damping device capable of being controlled to provide a variable resistive force may in principle be incorporated into the variable stiffness suspension systems 100, 100'.

With continued reference to FIG. 1 and in accordance with the first embodiment of the variable stiffness suspension system 100, linear piston dampers 132 are coupled to both the drive assembly 50 and to the rear wheel support assembly 42 to provide a variable force resistive to movement of the front wheels 30 and rear wheels 40, respectively. A first linear piston damper 132 is connected at a first end to the drive motor 52 and at a second end to the frame 12. As the front wheels 30 are coupled to the drive assembly 50, pivotal, generally vertical movement of the front wheels 30 is resisted by the first linear piston damper 132. Similarly, a second linear piston damper 132 is connected at a first end to the rear wheel support assembly 42 and is connected at a second end to the frame 12 to resist pivotal, generally vertical movement of the rear wheels 40. Preferably, two forward linear piston dampers 132 are provided, one for each drive assembly 50. Similarly, two rear linear piston dampers 132 are also preferably provided, one for each rear wheel support assembly 42.

With reference now to FIG. 2, a second embodiment of the variable stiffness suspension system 100' incorporates rotary brakes 134 rather than linear piston dampers 132. More particularly, a first rotary brake 134 couples the front wheel support assembly 32 to the frame 12 at the forward pivot connection 34. A second rotary brake 134 couples the rear wheel support assembly 42 to the frame 12 at the rear pivot connection 44. Preferably, two forward rotary brakes 134 are provided, one for each front wheel support assembly 32. Similarly, two rear rotary brakes 134 are also preferably provided, one for each rear wheel support assembly 42.

The linear piston damper 132 may be and is preferably directly connected to the drive assembly 50 (see FIG. 1), while the rotary brake 134 also may be and is preferably directed connected to the drive assembly 50 (see FIG. 2).

Figure 3:
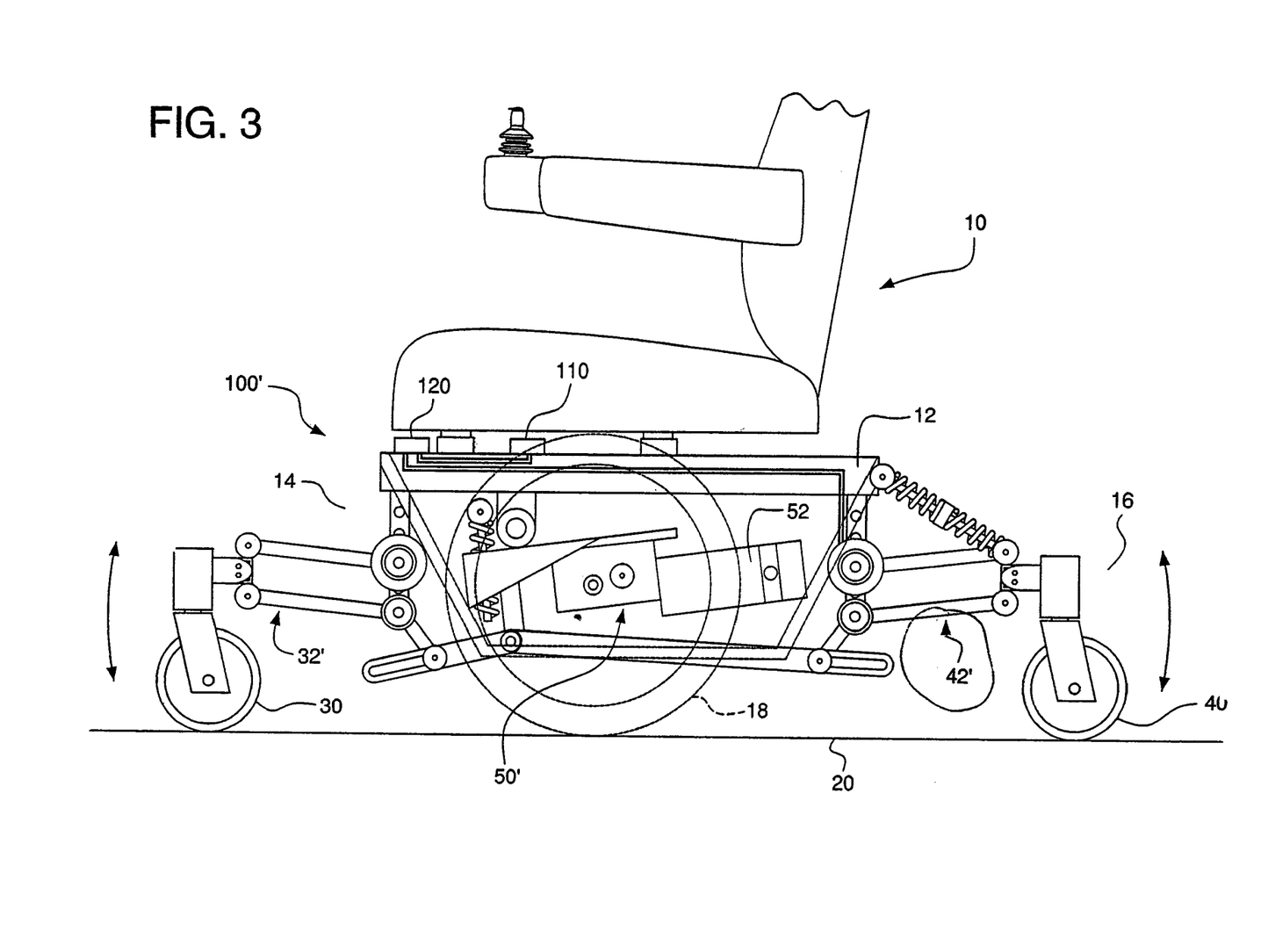
FIG. 3 a schematic partial side view of a powered wheelchair having one of its drive wheels removed and portions of the chassis/body broken-away to illustrate elements of a second drive system coupled with the second embodiment variable stiffness suspension system of FIG. 2.

Both the first and second embodiments of the variable stiffness suspension system 100, 100' are shown in conjunction with a first anti-tip system having the drive assembly 50 of the '165 patent. However, with reference to FIG. 3, the variable stiffness suspension systems 100, 100' are not limited to use with drive assembly 50, and may be used in conjunction with a multitude of wheelchair designs. For example, the second embodiment suspension system 100' is shown in FIG. 3 coupled with a second wheelchair drive system having a second drive assembly 50', along with second front and rear wheel support assemblies 32' and 42', respectively. The variable stiffness suspension systems 100, 100' are generally adaptable to powered wheelchairs having front and/or rear wheels coupled to the wheelchair frame for generally vertical movement.

Figure 4:
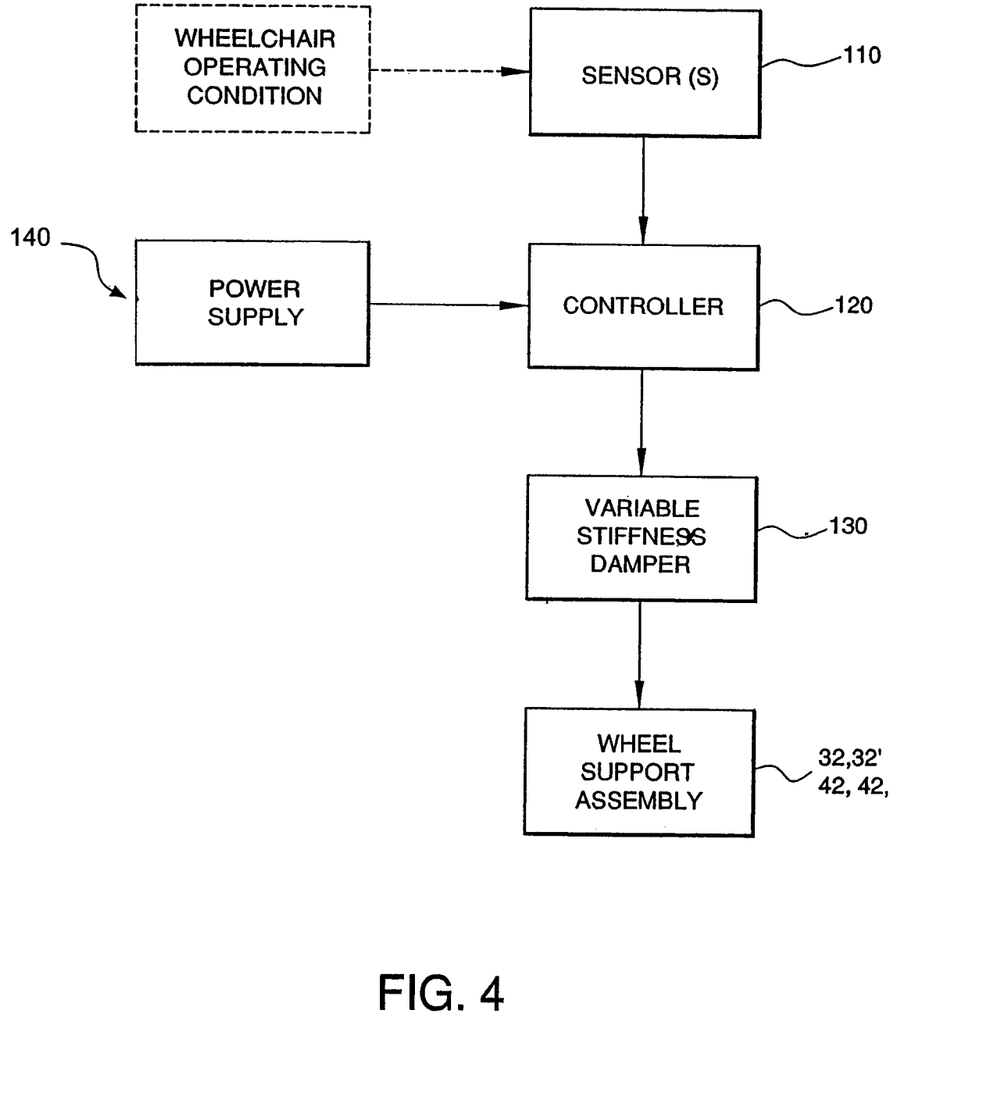
FIG. 4 is a schematic block diagram of the variable stiffness suspension systems of FIGS. 1-3.

With reference now to FIG. 4, the functional relationships among the elements of the variable stiffness suspension systems 100 and 100', the wheelchair operating condition, and the wheel support assemblies 32, 32', 42, and 42' are shown. The sensor or sensors 110 monitor one or more operating conditions of the wheelchair 10 and generate one or more control input signals to the controller 120. The controller 120 interprets the control input signal(s), and generates a control output signal to the controllable damper 130 corresponding to a desired response (the level of resistive force developed) of the controllable damper 130. As the controllable damper 130 is coupled (either directly or indirectly) to the wheel support assembly 32, 32', 42, 42', movement of the front or rear wheels 30, 40, respectively, is restrained in a manner consistent with the wheelchair operating conditions. As discussed above, a higher level of resistance developed by the controllable damper 130 is generally desirable when the wheelchair 10 is operating on a downward slope, to retard any forward pitching of the wheelchair 10 and promote stability of the wheelchair 10. As is further discussed above, a lower level of resistance developed by the controllable damper 130 is generally desirable when the wheelchair 10 is moving over an obstacle such as a curb.

The force developed by the controllable dampers 130 to resist movement of the front wheels 30 and/or rear wheels 40 may be controlled separately. Therefore, the resistive force in a damper 130 on the first lateral side need not match the resistive force in a damper 130 on the second lateral side, and the resistive force in the forward wheels 30 need not match the resistive force in the rear wheels 40. For example, when a wheelchair 2 impacts a curb at an oblique angle it may be desirable to control the suspension of each wheel independently or in series, for example, first controlling the resistive force applied to the wheel(s) on the first lateral side and, subsequently, controlling the resistive force applied to the wheel(s) on the second lateral side.

Further, a variety of other modifications to the embodiments will be apparent to those skilled in the art from the disclosure provided herein. For example, the sensor 110 may be used to sense vertical position of the wheels 30, 40 relative to the frame 12 and the resistive force may varied based at least in part upon the vertical position of the wheels 30, 40. Furthermore, while the sensor 110 is preferably a device which automatically senses the operating condition of the wheelchair 10, a manual switch may be provided, operable by the wheelchair occupant to manually provide the control input signal. Further, the power supply 140 may be integrated with the controller 120.

The present invention may be embodied in other specific forms without departing from the spirit or essential attributes thereof and, accordingly, reference should be made to the appended claims, rather than to the foregoing specification, as indicating the scope of the invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A variable suspension system for use with a wheelchair having a forward end and a rear end, a frame, and at least one wheel coupled to at least one end of the frame for movement relative to the frame, the wheelchair further having a drive assembly operably coupled to the wheel to move the wheel toward or away from a supporting surface upon which the wheelchair is supported in response to moments generated by the drive assembly, the suspension system comprising:

at least one sensor for sensing the vertical position of the wheel relative to the frame and generating a control input signal indicative of the wheel position;

a controller operatively coupled to the sensor and responsive to the control input signal for generating a control output signal; and a controllable damper having a variable stiffness, operably coupled to the controller, the wheel, and the frame to provide a variable resistive force capable of being varied to any of multiple levels of force within a continuous range between upper and lower limits in response to the control output signal and resistive to the movement of the wheel, the resistive force being varied based at least in part upon the vertical position of the wheel.

2. The suspension system of claim 1 wherein the wheel is a rear wheel pivotally mounted to the rear end of the wheelchair.

3. The suspension system according to claim 1 wherein the controllable damper is a magneto-rheological fluid damper.

4. The suspension system according to claim 1 wherein the controllable damper is a fluid damper having an orifice with a size capable of being varied in response to the control output signal.

5. The suspension system according to claim 1 wherein the controllable damper is a linear damper.

6. The suspension system according to claim 1 further comprising a biasing member coupled to the wheel and biasing the wheel in a normal operative position wherein the wheel is positioned above a supporting surface in the predetermined position.

7. The suspension system according to claim 1, the wheelchair having a second wheel coupled to the frame for generally vertical movement relative to the frame, the suspension system comprising a second controllable damper operably coupled to the controller, the second wheel and the frame and providing a variable resistive force capable of being varied in response to the control output signal and resistive to the generally vertical movement of the second wheel.

8. The suspension system according to claim 1, the wheelchair having a second wheel coupled to the frame for generally vertical movement relative to the frame, the suspension system comprising a second controllable damper operably coupled to the controller, the second wheel and the frame and providing a variable resistive force capable of being independently varied in response to a second control output signal and resistive to the generally vertical movement of the second wheel.

9. A variable suspension system for use with a wheelchair having a forward end and a rear end, a frame, and at least one wheel coupled to at least one end of the frame for movement relative to the frame, the wheelchair further having a drive assembly operably coupled to the wheel to move the wheel toward or away from a supporting surface upon which the wheelchair is supported in response to moments generated by the drive assembly, the suspension system comprising:
at least one sensor for sensing an operating condition of the wheelchair and generating a control input signal indicative of the operating condition;
a controller operatively coupled to the sensor and responsive to the control input signal for generating a control output signal; and
a controllable rotary brake having a variable stiffness, operably coupled to the controller, the wheel, and the frame to provide a variable resistive force capable of being varied to any of multiple levels of force within a continuous range between upper and lower limits in response to the control output signal and resistive to the movement of the wheel.

10. The suspension system of claim 9 wherein the wheel is a rear wheel pivotally mounted to the rear end of the wheelchair.

11. The suspension system of claim 9 wherein the controllable rotary brake resists upward motion of the wheel.

12. The suspension system according to claim 9 wherein the sensor is one of a tilt sensor, a microswitch or a gyroscopic sensor.

13. The suspension system according to claim 9, the drive assembly of the wheelchair comprising a motor, wherein the sensor is a torque sensor adapted to sense torque generated by the motor.

14. The suspension system according to claim 9 further comprising a biasing member coupled to the wheel and biasing the wheel in a predetermined position wherein the wheel is positioned above a supporting surface in the predetermined position.

15. The suspension system according to claim 9, the wheelchair having a second wheel coupled to the frame for generally vertical movement relative to the frame, the suspension system comprising a second controllable rotary brake operably coupled to the controller, the second wheel and the frame and providing a variable resistive force capable of being varied in response to the control output signal and resistive to the generally vertical movement of the second wheel.

16. The suspension system according to claim 9, the wheelchair having a second wheel coupled to the frame for generally vertical movement relative to the frame, the suspension system comprising a second controllable rotary brake operably coupled to the controller, the second wheel and the frame and providing a variable resistive force capable of being independently varied in response to a second control output signal and resistive to the generally vertical movement of the second wheel.

17. A variable suspension system for use with a wheelchair having a forward end and a rear end, a frame, and at least one wheel coupled to at least one end of the frame for movement relative to the frame, the wheelchair further having a drive assembly operably coupled to the wheel to move the wheel toward or away from a supporting surface upon which the wheelchair is supported in response to moments generated by the drive assembly, the suspension system comprising:
at least one linearly variable displacement transducer sensor for sensing an operating condition of the wheelchair and generating a control input signal indicative of the operating condition;
a controller operatively coupled to the sensor and responsive to the control input signal for generating a control output signal; and
a controllable damper having a variable stiffness, operably coupled to the controller, the wheel, and the frame to provide a variable resistive force capable of being varied to any of multiple levels of force within a continuous range between upper and lower limits in response to the control output signal and resistive to the movement of the wheel.

18. The suspension system of claim 17 wherein the wheel is a rear wheel pivotally mounted to the rear end of the wheelchair.

19. The suspension system according to claim 17 wherein the controllable damper is a magneto-rheological fluid damper.

20. The suspension system according to claim 17 wherein the controllable damper is a fluid damper having an orifice with a size capable of being varied in response to the control output signal.

21. The suspension system according to claim 17 wherein the controllable damper is a linear damper.

22. The suspension system according to claim 17 further comprising a biasing wheel and biasing the wheel in a predetermined position wherein the wheel is positioned above a supporting surface in the predetermined position.

23. The suspension system according to claim 17 the wheelchair having a second wheel coupled to the frame for generally vertical movement relative to the frame, the suspension system comprising a second controllable damper operably coupled to the controller, the second wheel and the frame and providing a variable resistive force capable of being varied in response to the control output signal and resistive to the generally vertical movement of the second wheel.

24. The suspension system according to claim 17 the wheelchair having a second wheel coupled to the frame for generally vertical movement relative to the frame, the suspension system comprising a second controllable damper operably coupled to the controller, the second wheel and the frame and providing a variable resistive force capable of being independently varied in response to a second control output signal and resistive to the generally vertical movement of the second wheel.

* * * * *

UNITED STATES PATENT AND TRADEMARK OFFICE
CERTIFICATE OF CORRECTION

PATENT NO. : 7,314,220 B2  Page 1 of 1
APPLICATION NO. : 10/881126
DATED : January 1, 2008
INVENTOR(S) : Turturiello et al.

It is certified that error appears in the above-identified patent and that said Letters Patent is hereby corrected as shown below:

<u>In Column 2</u>
At line 52, change "combination with or more" to --combination with one or more--.

Signed and Sealed this

Twenty-fourth Day of June, 2008

JON W. DUDAS
*Director of the United States Patent and Trademark Office*